(12) United States Patent
Suzuki et al.

(10) Patent No.: US 11,620,584 B2
(45) Date of Patent: Apr. 4, 2023

(54) SERVER, INFORMATION PROCESSING METHOD, AND NON- TRANSITORY COMPUTER-READABLE STORAGE MEDIUM STORING A PROGRAM

(71) Applicant: TOYOTA JIDOSHA KABUSHIKI KAISHA, Toyota (JP)

(72) Inventors: Koichi Suzuki, Miyoshi (JP); Makoto Akahane, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 630 days.

(21) Appl. No.: 16/540,220

(22) Filed: Aug. 14, 2019

(65) Prior Publication Data

US 2020/0118048 A1 Apr. 16, 2020

(30) Foreign Application Priority Data

Oct. 10, 2018 (JP) .............................. JP2018-192000

(51) Int. Cl.
*G06Q 10/02* (2012.01)
*G01C 21/34* (2006.01)

(52) U.S. Cl.
CPC ......... *G06Q 10/02* (2013.01); *G01C 21/3423* (2013.01)

(58) Field of Classification Search
CPC .... G06Q 10/02; G06Q 30/0645; G06Q 50/26; G01C 21/3423; G01C 21/3438;
(Continued)

(56) References Cited

U.S. PATENT DOCUMENTS 6,421,606 B1 * 7/2002 Asai ................... G01C 21/3688
701/410
2008/0033640 A1 * 2/2008 Amano ............ G08G 1/096838
701/414

(Continued)

FOREIGN PATENT DOCUMENTS

JP 2005-266900 A 9/2005

OTHER PUBLICATIONS

Johnson, Emma; "6 Parking Apps That Save You Time and Money"; Dec. 18, 2014. (Year: 2014).*

*Primary Examiner* — Omar Zeroual
*Assistant Examiner* — Dione N. Simpson
(74) *Attorney, Agent, or Firm* — Oblon, McClelland, Maier & Neustadt, L.L.P.

(57) ABSTRACT

A server communicates with a terminal device used by a user, and an external server. The server includes a memory, a server, and a processor. The memory stores map information and timetable information for public transportation. The server communication device acquires, from the external server, a rental place and a riding start time of a vehicle reserved by the user. The processor sets the rental place as a destination and the riding start time as an arrival time based on the map information and the timetable information, and executes a route search. The processor controls the server communication device such that the server communication device outputs a route, a mode of transport, and an estimated travel time, which are acquired from the route search, and that the second application displays, as the users' schedule, the route, the mode of transport, and the estimated travel time.

4 Claims, 13 Drawing Sheets

(58) Field of Classification Search
CPC ............ G01C 21/3605; G01C 21/3694; G01C 21/3685; G07B 15/00; G07B 15/02
USPC ........................................................... 705/5
See application file for complete search history.

(56) References Cited

U.S. PATENT DOCUMENTS

2010/0017118 A1* 1/2010 Dougherty ............. G08G 1/143
  701/533
2015/0371155 A1* 12/2015 Saint-Just .......... G06Q 10/1093
  705/5
2016/0334235 A1* 11/2016 Gustafson .......... G01C 21/3492
2017/0032584 A1* 2/2017 Moran .................... H04W 4/00

* cited by examiner

FIG. 5

| IDENTIFICATION INFORMATION OF USER | TITLE | PLACE | START TIME | END TIME |
|---|---|---|---|---|
| U1 | XXXX MEETING | TOWER A | AT 12:30, O MONTH, O DAY, OO YEAR | AT 13:00, O MONTH, O DAY, OO YEAR |
| | YYYY MEETING | BUILDING B | AT 15:00, O MONTH, O DAY, OO YEAR | AT 16:00, O MONTH, O DAY, OO YEAR |
| | CONSTRUCTION | HOME | AT 10:00, O MONTH, X DAY, OO YEAR | AT 15:00, O MONTH, X DAY, OO YEAR |
| • • • • | • • • • | • • • • | • • • • | • • • • |

FIG. 7

| IDENTIFICATION INFORMATION OF USER | IDENTIFICATION INFORMATION OF VEHICLE | RENTAL PLACE | RIDING START TIME | RIDING END TIME |
|---|---|---|---|---|
| U1 | Y1 | X STATION PARKING LOT | AT 14:10, O MONTH O DAY OO YEAR | AT 17:10, O MONTH O DAY OO YEAR |
| U2 | Y2 | Z CITY PARKING LOT | AT 12:30, O MONTH X DAY OO YEAR | AT 15:00, O MONTH X DAY OO YEAR |
| U3 | Y3 | X STATION PARKING LOT | AT 10:00, O MONTH X DAY OO YEAR | AT 15:00, O MONTH X DAY OO YEAR |
| ⋯ | ⋯ | ⋯ | ⋯ | ⋯ |

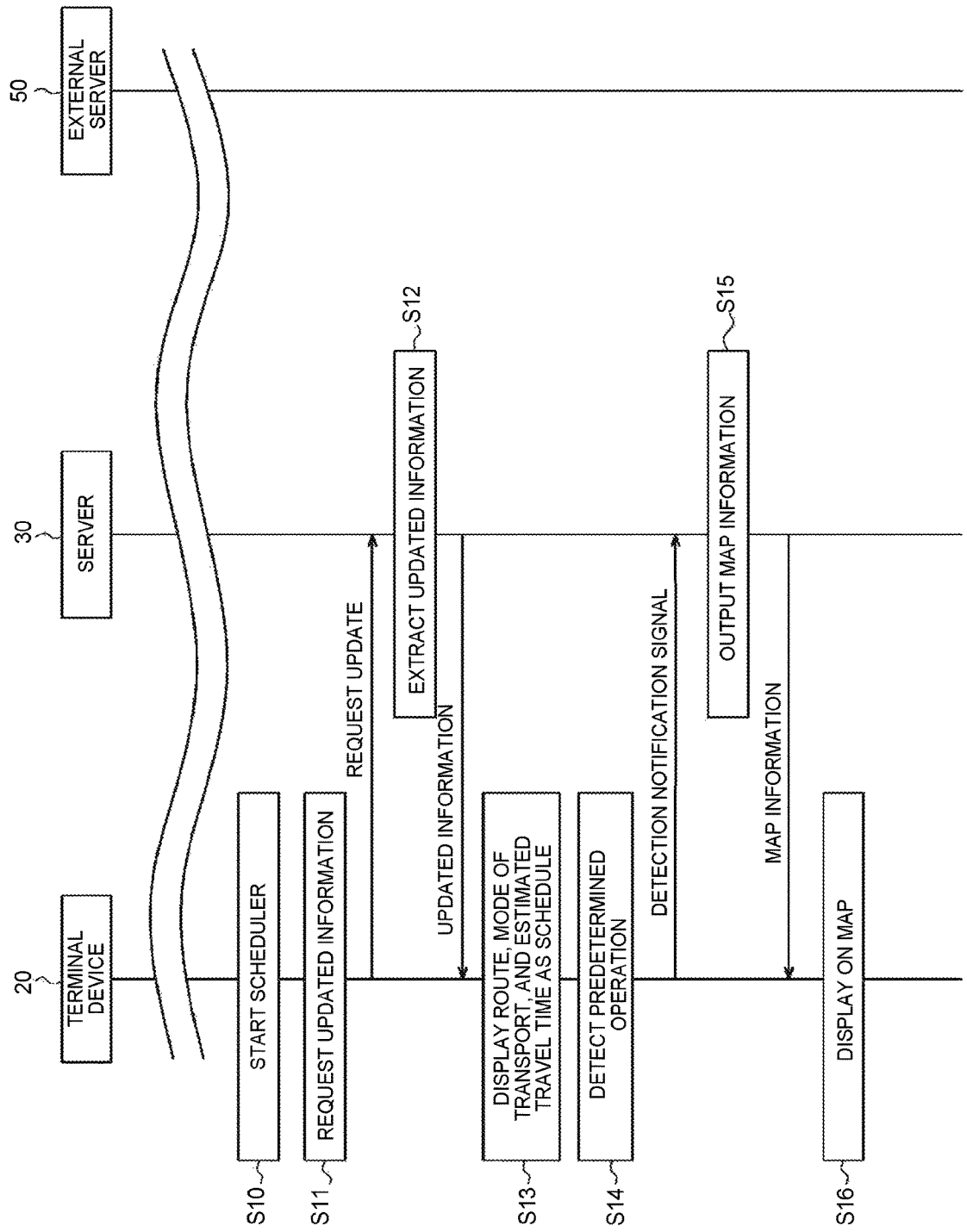

SERVER, INFORMATION PROCESSING METHOD, AND NON-TRANSITORY COMPUTER-READABLE STORAGE MEDIUM STORING A PROGRAM

INCORPORATION BY REFERENCE

The disclosure of Japanese Patent Application No. 2018-192000 filed on Oct. 10, 2018 including the specification, drawings, and abstract is incorporated herein by reference in its entirety.

BACKGROUND

1. Technical Field

The present disclosure relates to a server, an information processing method, and a non-transitory computer-readable storage medium storing a program.

2. Description of Related Art

Conventionally, a technology for managing a travel route acquired by a route search has been known. For example, Japanese Unexamined Patent Application Publication No. 2005-266900 (JP 2005-266900 A) discloses a route search system that stores a plurality of scheduler formats and converts the format of a travel route so that it can be used on a scheduler of a user to which the travel route is provided.

SUMMARY

A technology for reserving a vehicle to be shared, using a dedicated application in a mobile terminal such as a smartphone, has been known. However, a technology disclosed in JP 2005-266900 A cannot work in conjunction with applications other than an application for a route search. In other words, in the technology disclosed in JP 2005-266900 A, after a user reserves a vehicle to be shared, a route to a rental place of the vehicle and the like are not reflected in the scheduler, and for this reason, it is inconvenient for the user to reserve a vehicle to be shared.

The present disclosure provides a server, an information processing method, and a non-transitory computer-readable storage medium storing a program that can improve convenience for a user when the user reserves a vehicle.

A server according to a first aspect of the present disclosure is configured to communicate with a terminal device used by a user, and an external server. The terminal device is configured to execute a first application for the user to reserve a rental place and a riding start time of a vehicle while communicating with the external server, and execute a second application that displays a schedule of the user. The server includes: a memory configured to store map information and timetable information for public transportation; a server communication device configured to acquire, from the external server, the rental place and the riding start time of the vehicle reserved by the user; and a processor configured to set the rental place as a destination and the riding start time as an arrival time based on the map information and the timetable information, and execute a route search. The processor is configured to control the server communication device such that the server communication device outputs, to the terminal device, a route, a mode of transport, and an estimated travel time, which are acquired from the route search, and that the second application of the terminal device displays, as the schedule of the user, the route, the mode of transport, and the estimated travel time.

The memory may store a management database that includes the schedule of the user used in the second application. The processor may update the management database to reflect, in the management database, the route, the mode of transport, and the estimated travel time, which are acquired from the route search. Further, the processor may control the server communication device such that the server communication device outputs, to the terminal device, a notification indicating that the management database is updated.

When a predetermined operation of the user on the second application is detected, the processor may control the server communication device such that the server communication device outputs the map information to the terminal device, and that the second application displays the searched route on a map of the terminal device.

The mode of transport may include at least one of walking, a bus, and a train.

An information processing method according to a second aspect of the present disclosure uses a server configured to communicate with a terminal device used by a user, and an external server. The terminal device is configured to execute a first application for the user to reserve a rental place and a riding start time of a vehicle while communicating with the external server, and execute a second application that displays a schedule of the user. The information processing method includes: a step of storing, in the server, map information and timetable information for public transportation; a step of acquiring, by the server, the rental place and the riding start time of the vehicle reserved by the user from the external server, a step of setting, by the server, the rental place as a destination and the riding start time as an arrival time based on the map information and the timetable information, and executing, by the server, a route search; and a step of outputting, by the server, a route, a mode of transport, and an estimated travel time, which are acquired from the route search, to the terminal device, such that the second application of the terminal device displays, as a schedule of the user, the route, the mode of transport, and the estimated travel time.

A third aspect of the present disclosure relates to a non-transitory computer-readable storage medium storing a program that causes a server to execute a control process. The server is configured to communicate with a terminal device used by a user, and an external server. The terminal device is configured to execute a first application for the user to reserve a rental place and a riding start time of a vehicle while communicating with the external server, and execute a second application that displays a schedule of the user. The control process includes: a step of storing map information and timetable information for public transportation; a step of acquiring, from the external server, the rental place and the riding start time of the vehicle reserved by the user; a step of setting the rental place as a destination and the riding start time as an arrival time based on the map information and the timetable information, and executing a route search; and a step of outputting, to the terminal device, a route, a mode of transport, and an estimated travel time, which are acquired from the route search, such that the second application of the terminal device displays, as the schedule of the user, the route, the mode of transport, and the estimated travel time.

With a server, an information processing method, and a non-transitory computer-readable storage medium storing a program according to each aspect of the present disclosure, it is possible to improve convenience for a user when the user reserves a vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 5 is a table illustrating an example of a management database stored in the server;

FIG. 7 is a table illustrating an example of a vehicle-sharing database stored in the external server;

FIG. 13 is a sequence diagram continued from FIG. 12.

DETAILED DESCRIPTION OF EMBODIMENTS

In each of the drawings referred to in the following description, like signs denote like elements, and repeated descriptions will be omitted.

Configuration of Information Processing System

Figure 1:
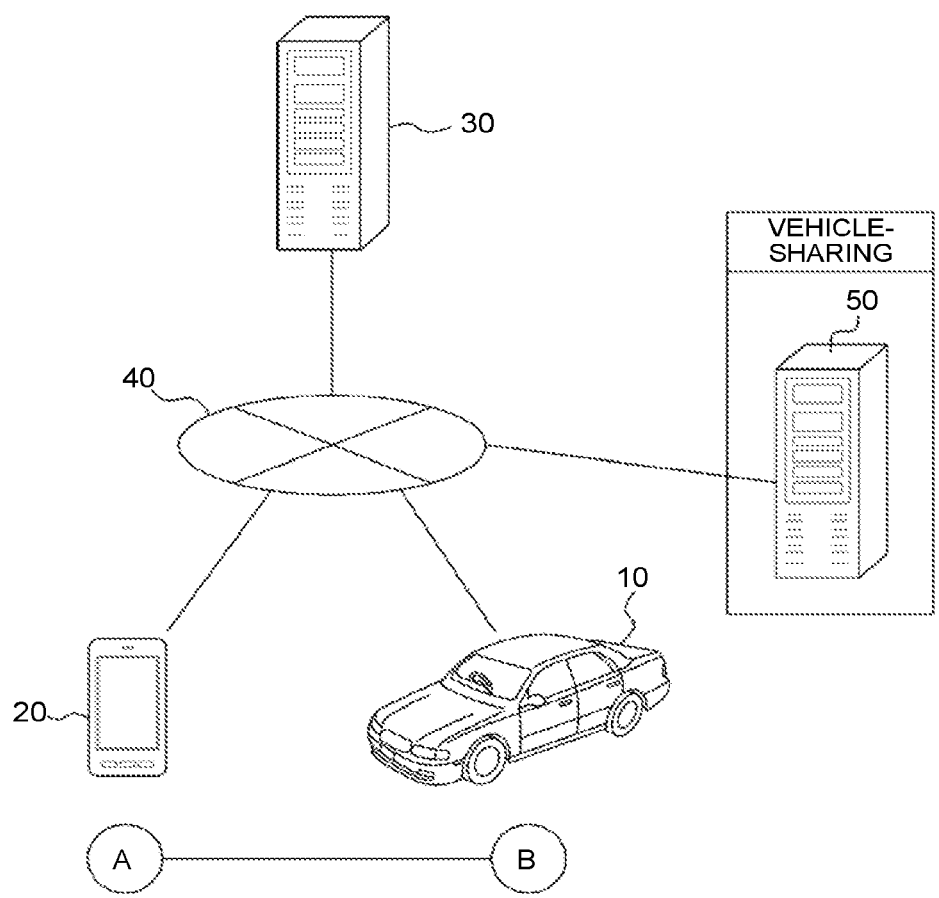
FIG. 1 is a diagram schematically illustrating a configuration of an information processing system according to one embodiment of the present disclosure.

FIG. 1 is a diagram schematically illustrating a configuration of an information processing system 1. The information processing system 1 includes one or more vehicles 10, one or more terminal devices 20, and a server 30. Although FIG. 1 illustrates one vehicle 10 and one terminal device 20 for convenience of description, each of the number of the vehicles 10 and the number of the terminal devices 20 may be discretionarily determined. Here, the vehicles 10 and the terminal devices 20 are included in the information processing system 1. The vehicle 10, the terminal device 20, and the server 30 are connected to a network 40, such as the Internet. Further, the one or more terminal devices 20 and the server 30 can communicate with an external server 50 via the network 40. The external server 50 is a manager of a system external to the information processing system 1. In the present embodiment, the external server 50 manages reserving a shared vehicle.

The vehicle 10 is, for example, a car, but is not limited thereto, and may be any vehicle which a person can ride. In the present embodiment, the vehicle 10 may be also used as the shared vehicle. The terminal device 20 is, for example, a general-purpose mobile terminal, such as a smartphone or a tablet terminal, but is not limited thereto, and may be any mobile terminal, such as a device dedicated to the information processing system 1. The terminal device 20 is carried by a user. The server 30 includes one server device or a plurality of server devices capable of communicating with each other. The server 30 is installed at, for example, an information center that collects and analyzes information on the vehicle 10. In the present embodiment, for convenience of description, it is assumed that the server 30 is one server device.

For example, the user of the terminal device 20 can reserve the vehicle 10 to be shared, using a dedicated application (hereinafter referred to as a "reservation application") downloaded to the terminal device 20. To ride the reserved vehicle 10, the user of the terminal device 20 travels to a parking place of the vehicle 10 (hereinafter referred to as a "rental place") by a reserved riding start time. In the example illustrated in FIG. 1, the user carrying the terminal device 20 is positioned at a departure place A. In addition, the parked vehicle 10 is positioned at the rental place B.

The information processing system 1 according to the present embodiment assists the user to reserve the vehicle 10. To overview, the information processing system 1 searches for a route and determines a mode of transport to travel from the user's departure place A to the rental place B, and reflects a travel schedule in a scheduler of the user. Details of assistance for the user, executed by the information processing system 1, will be described below.

Configuration of Vehicle

Figure 2:
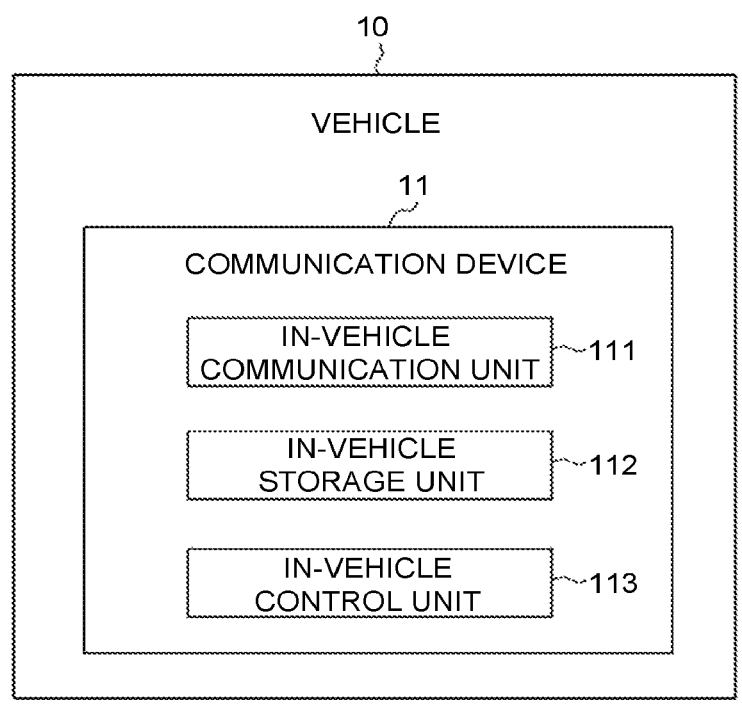
FIG. 2 is a block diagram schematically illustrating a configuration of a vehicle.

As illustrated in FIG. 2, the vehicle 10 includes a communication device 11. The communication device 11 is connected to be able to communicate with the vehicle 10 via, for example, an in-vehicle network, such as a controller area network (CAN) and the like, or a dedicated line.

The communication device 11 may be, for example, an in-vehicle communicator, such as a data communication module (DCM) and the like. Specifically, the communication device 11 includes an in-vehicle communication unit 111, an in-vehicle storage unit 112, and an in-vehicle control unit 113.

The in-vehicle communication unit 111 includes a communication module connected to the network 40. For example, the in-vehicle communication unit 111 may include a communication module corresponding to a mobile communication standard, such as Fourth Generation (4G) mobile communication. In the present embodiment, the communication device 11 is connected to the network 40 via the in-vehicle communication unit 111. Here, the vehicle 10 may include one or more receivers corresponding to any satellite positioning system. For example, the vehicle 10 may include a global positioning system (GPS) receiver. The communication device 11 may transmit, to the server 30, position information of the vehicle 10 acquired by the GPS receiver.

The in-vehicle storage unit 112 includes one or more memories. In the present embodiment, examples of a "memory" include a semiconductor memory, a magnetic memory, and an optic memory, but are not limited thereto. Each memory included in the in-vehicle storage unit 112 may function as, for example, a primary storage device, a secondary storage device, or a cache memory. The in-vehicle storage unit 112 stores any information used for an operation of the communication device 11. For example, the in-vehicle storage unit 112 may store a system program and an application program. The information stored in the in-vehicle storage unit 112 can be updated with, for example, information acquired from the network 40 via the in-vehicle communication unit 111.

The in-vehicle control unit 113 includes one or more processors. In the present embodiment, a "processor" is a general-purpose processor or a processor dedicated to a specific process, but is not limited thereto. The in-vehicle control unit 113 controls overall operation of the communication device 11.

Configuration of Terminal Device

Figure 3:
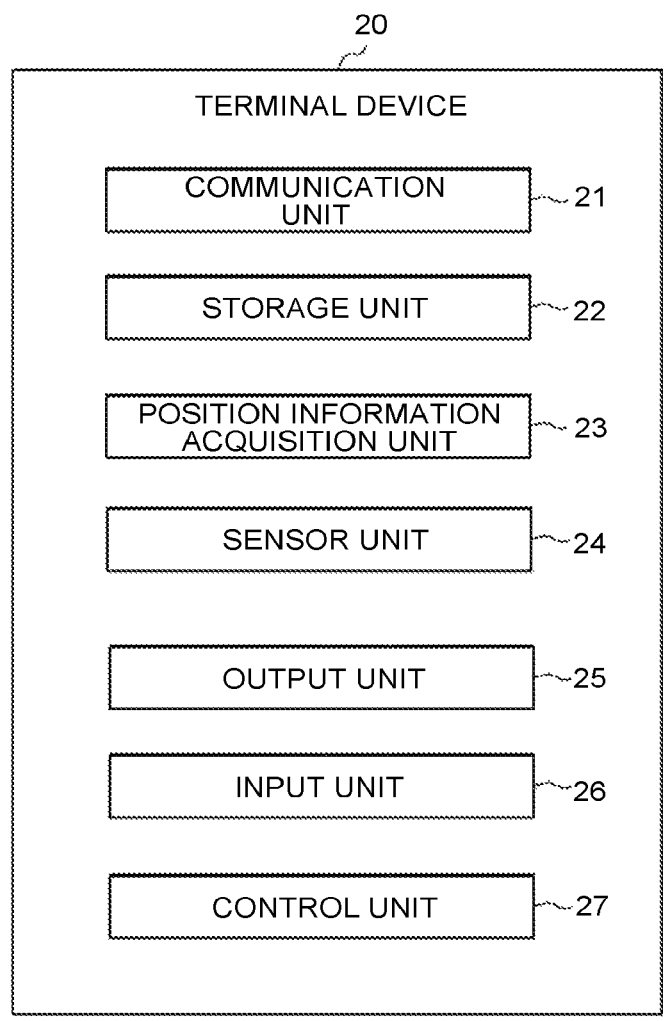
FIG. 3 is a block diagram schematically illustrating a configuration of a terminal device.

As illustrated in FIG. 3, the terminal device 20 includes a communication unit 21, a storage unit 22, a position information acquisition unit 23, a sensor unit 24, an output unit 25, an input unit 26, and a control unit 27.

The communication unit 21 includes a communication module connected to the network 40. For example, the communication unit 21 may include a communication module corresponding to a mobile communication standard, such as 4G mobile communication. In the present embodiment, the terminal device 20 is connected to the network 40 via the communication unit 21.

The storage unit 22 includes one or more memories. Each memory included in the storage unit 22 may function as, for example, a primary storage device, a secondary storage device, or a cache memory. The storage unit 22 stores any information used for an operation of the terminal device 20. For example, the storage unit 22 may store a system program, an application program, identification information of the terminal device 20, and identification information of the user. Here, the identification information of the terminal device 20 may be used as the identification information of the user. The information stored in the storage unit 22 can be updated with, for example, information acquired from the network 40 via the communication unit 21.

The position information acquisition unit 23 includes one or more receivers corresponding to any satellite positioning system. For example, the position information acquisition unit 23 may include a GPS receiver. The position information acquisition unit 23 acquires position information of the terminal device 20. The position information acquisition unit 23 may output the position information of the terminal device 20 to at least one of the server 30 and the external server 50.

The sensor unit 24 includes one or more sensors that detect information on the operation of the terminal device 20 or the surrounding environment. For example, the sensor unit 24 may include an acceleration sensor, an angular velocity sensor, a magnetic sensor, and an atmospheric pressure sensor. However, the sensors included in the sensor unit 24 are not limited thereto, and may be any sensor, such as an illuminance sensor, a temperature sensor, or an image sensor (a camera). The sensor unit 24 acquires information detected by each of the sensors as sensor information. For example, the sensor information of the sensor unit 24 may include acceleration and angular velocity of the terminal device 20, and a magnetic field and atmospheric pressure around the terminal device 20.

The output unit 25 includes one or more output interfaces that output information to the user. Examples of the output interface included in the output unit 25 include a panel display that outputs information in the form of video and a speaker that outputs information in the form of audio, but are not limited thereto.

The input unit 26 includes one or more input interfaces that detect a user input. Examples of the input interface included in the input unit 26 include a touch screen integrally installed with the panel display of the output unit 25, and a microphone that receives an audio input, but are not limited thereto.

The control unit 27 includes one or more processors. For example, the control unit 27 may include a general-purpose processor, and a processor dedicated to a specific process. For example, the control unit 27 may be a central processing unit (CPU). The control unit 27 controls overall operation of the terminal device 20.

For example, the control unit 27 accumulates, in the storage unit 22, the position information of the terminal device 20 acquired by the position information acquisition unit 23, and the sensor information acquired by the sensor unit 24. The control unit 27 notifies, via the communication unit 21, at least one of the server 30 and the external server 50, of the identification information of the user, and the position information of the terminal device 20 and the sensor information accumulated in the storage unit 22. Here, the notification may be executed at any given time (for example, at predetermined time intervals). The control unit 27 may delete, from the storage unit 22, the notified position information of the terminal device 20 and the sensor information.

In addition, the control unit 27 executes the reservation application and the scheduler. The reservation application is a first application for the user to reserve the vehicle 10 using the terminal device 20 as described above. Moreover, the scheduler is a second application for the user to register and manage a schedule of the user (activity schedule).

Configuration of Server

Figure 4:
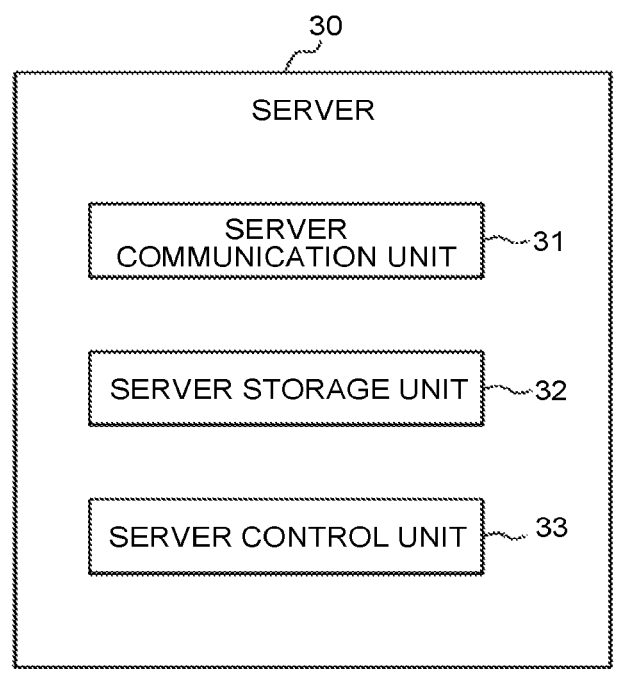
FIG. 4 is a block diagram schematically illustrating a configuration of a server.

As illustrated in FIG. 4, the server 30 includes a server communication unit 31, a server storage unit 32, and a server control unit 33. The server 30 is a server device that provides traffic assistance to the user of the terminal device 20 and the user of the vehicle 10. Traffic assistance includes, for example, a route search to a destination, and provision of map information and traffic information. In addition, in the present embodiment, the server 30 further manages the scheduler.

The server communication unit 31 includes a communication module connected to the network 40. For example, the server communication unit 31 may include a communication module corresponding to a wired local area network (LAN) standard. In the present embodiment, the server 30 is connected to the network 40 via the server communication unit 31.

The server storage unit 32 includes one or more memories. Each memory included in the server storage unit 32 may function as, for example, a primary storage device, a secondary storage device, or a cache memory. The server storage unit 32 stores any information used for an operation of the server 30. For example, the server storage unit 32 may store a system program, an application program, the map information, traffic information, timetable information of public transportation such as a bus and a train, and a management database to be described below. The information stored in the server storage unit 32 may be updated with, for example, information acquired from the network 40 via the server communication unit 31.

As illustrated in FIG. 5, the management database includes, for example, a schedule table of the user. The schedule table includes the identification information of the user, a title indicating the content of the schedule, a place of the schedule, and a start time and an end time of the schedule. The user can activate the scheduler on the terminal device 20, and register and manage (for example, confirm, modify, or delete) the schedule. In the example of FIG. 5, a user having identification information of U1 (hereinafter referred to as "user U1") is scheduled to participate in XXXX Meeting at Tower A from 12:30 to 13:00 on O Month, O Day, OO Year. In addition, the user U1 is scheduled to participate in YYYY Meeting at Building B from 15:00 to 16:00 on O Month, O Day, OO Year. Further, construction is scheduled at the user U1's home from 10:00 to 15:00 on O Month, X Day, OO Year. Here, the identification information of the user used by the server 30 is set to be commonly used by the external server 50 as the identification information of the user (see FIG. 7).

The server control unit 33 includes one or more processors. For example, the server control unit 33 may include a general-purpose processor, and a processor dedicated to a specific process. For example, the server control unit 33 may be a CPU. The server control unit 33 controls overall operation of the server 30.

In the present embodiment, the server control unit 33 executes traffic assistance and schedule management. For traffic assistance, the server control unit 33 executes the route search to the destination based on the map information or the like. Further, for schedule management, the server control unit 33 updates the management database to reflect, for example, a newly acquired schedule of the user in the management database.

Furthermore, the server control unit 33 may deduce a current mode of transport of the user. For example, the server control unit 33 may deduce that the user's current mode of transport is walking, a bicycle, a passenger car, a bus, a train, or the like, based on the position information of the terminal device 20 and the sensor information. Any algorithm can be employed for deduction of the mode of transport. The server control unit 33 may deduce that the user is travelling, for example, on a train, based on the position information, and detection values of the acceleration sensor and the magnetic sensor. For schedule management, the server control unit 33 may determine whether the user is travelling as planned, using train delay information or the like, acquired from the network 40.

Configuration of External Server

Figure 6:
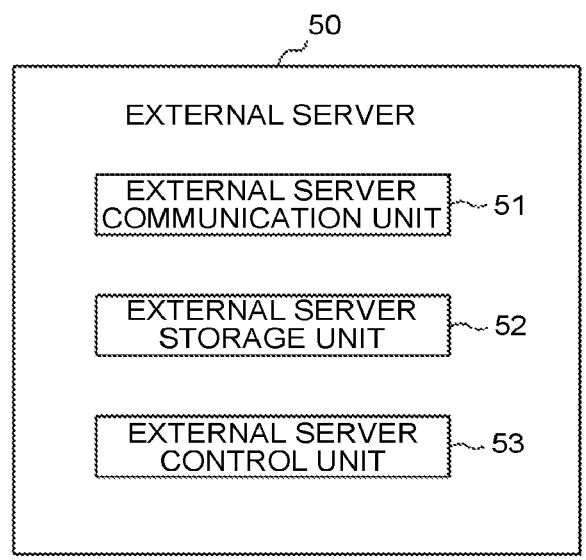
FIG. 6 is a block diagram schematically illustrating a configuration of an external server.

As illustrated in FIG. 6, the external server 50 includes an external server communication unit 51, an external server storage unit 52, and an external server control unit 53. As described above, the external server 50 is a server device that is external to the information processing system 1 and that manages the reservation of the vehicle 10 to be shared. In addition, the external server 50 manages the reservation application. The external server 50 can communicate with the terminal device 20 and the server 30 via the network 40.

The external server communication unit 51 includes a communication module connected to the network 40. The external server communication unit 51 may include, for example, a communication module corresponding to the wired LAN standard. In the present embodiment, the external server 50 is connected to the network 40 via the external server communication unit 51.

The external server storage unit 52 includes one or more memories. Each memory included in the external server storage unit 52 may function as, for example, a primary storage device, a secondary storage device, or a cache memory. The external server storage unit 52 stores any information used for an operation of the external server 50. For example, the external server storage unit 52 may store a system program, an application program, the map information, the traffic information, and a vehicle-sharing database to be described below. The information stored in the external server storage unit 52 can be updated with, for example, information acquired from the network 40 via the external server communication unit 51.

The vehicle-sharing database includes, for example, a reservation table as illustrated in FIG. 7. The reservation table includes the identification information of the user who has made the reservation, identification information of the vehicle 10 that has been reserved, the rental place, the riding start time, and the time when returning the vehicle 10 is scheduled (the riding end time). The user can activate the reservation application on the terminal device 20 to reserve the vehicle 10 and manage (for example, confirm, modify, or delete) the reservation of the vehicle 10. When the user reserves the vehicle 10 on the reservation application, the external server 50 reflects the reservation content in the reservation table. In the example of FIG. 7, the user U1 reserves the vehicle 10 having identification information of Y1 (hereinafter referred to as "vehicle 10-Y1") to be borrowed at an X station parking lot at 14:10 on O Month, O Day, OO Year, and to be returned by 17:10 on the same day. Moreover, a user U2 reserves a vehicle 10-Y2 to be borrowed at a Z city parking lot at 12:30 on O Month, X Day, OO Year, and to be returned by 15:00 on the same day. Further, a user U3 reserves the vehicle 10-Y1 at the X station parking lot at 10:00 on O Month, X Day, OO Year, and to be returned by 15:00 on the same day.

The external server control unit 53 includes one or more processors. For example, the external server control unit 53 may include a general-purpose processor, and a processor dedicated to a specific process. For example, the external server control unit 53 may be a CPU. The external server control unit 53 controls overall operation of the external server 50.

The external server control unit 53 receives various types of information notified from the vehicle 10 and the terminal device 20 via the external server communication unit 51. For example, the external server control unit 53 receives, from the terminal device 20, the identification information of the user and the reservation content of the vehicle 10 to be shared. As described above, the identification information of the user is commonly used by the server 30 as well as the terminal device 20 and the external server control unit 53.

Example of Display Screen

Figure 8:
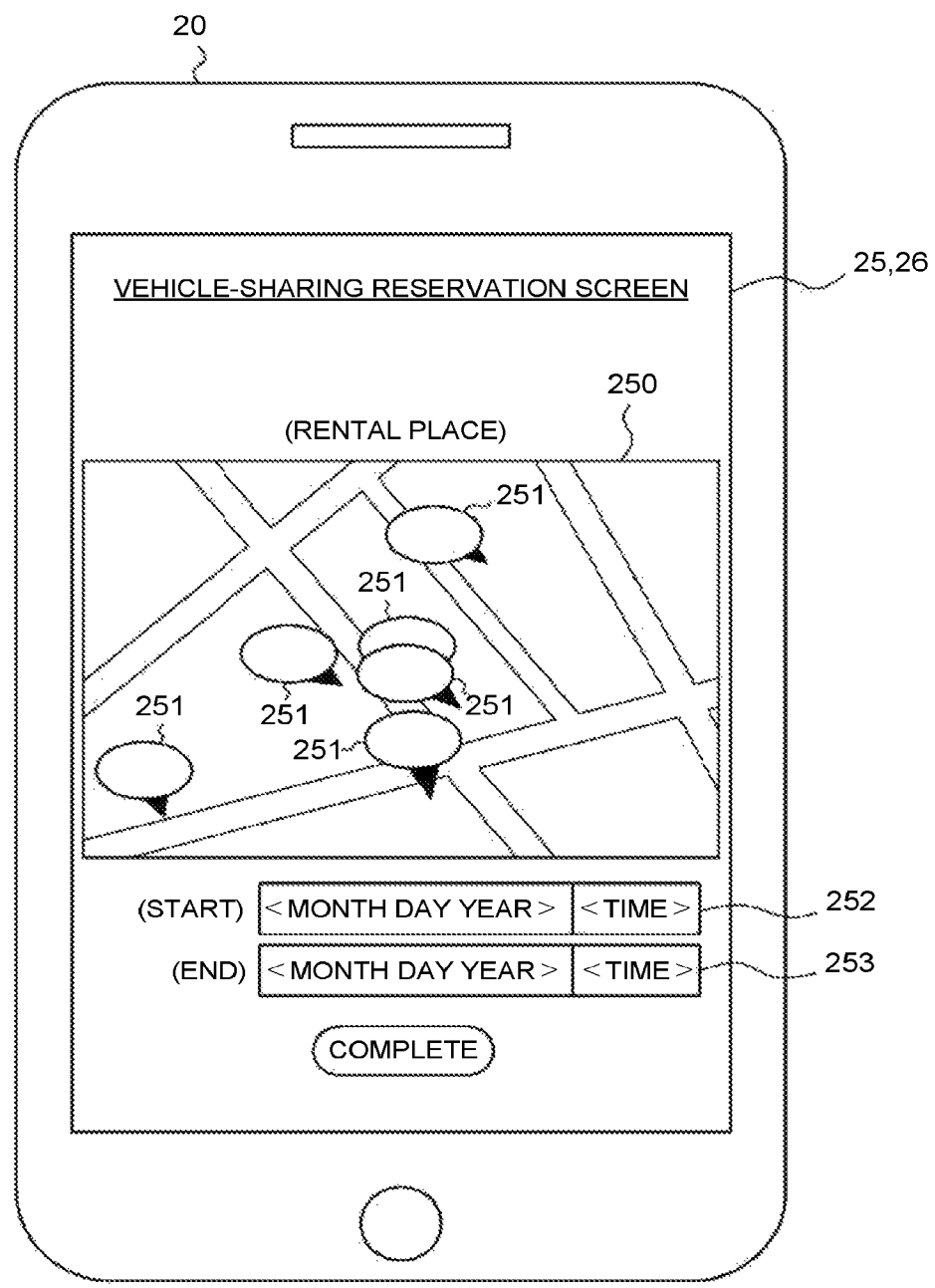
FIG. 8 is a diagram illustrating an example of a vehicle-sharing reservation screen.

FIG. 8 illustrates an example of a vehicle-sharing reservation screen displayed on the terminal device 20. The vehicle-sharing reservation screen is displayed on, for example, a touch panel display in which the output unit 25 and the input unit 26 are integrated. The vehicle-sharing reservation screen includes a rental place selection area 250 for selecting the rental place, a riding start time input area 252 for inputting the riding start time, and a riding end time input area 253 for inputting the riding end time. The rental place selection area 250 shows, on a map, parking places 251 located in the vicinity of a current position of the user or a designated place where the vehicle 10 to be shared is parked. Here, the designated place is designated in advance by the user, and may be, for example, a home or a workplace. In the example of FIG. 8, the parking places 251 are shown as images of pins. The user touches one of the parking places 251 in the rental place selection area 250 and designates it as the rental place. The user rides the vehicle 10 at the designated rental place. In addition, the user can input the riding start time into the riding start time input area 252. Moreover, the user can input the riding end time into the riding end time input area 253. In the present embodiment, the time may further include the day, the month, and the year. Here, a map does not need to be displayed on the rental place selection area 250. For example, addresses of the parking places 251 may be displayed on the rental place selection area 250 as a drop-down list to allow the user to select one of the addresses. Further, the input of the riding end time may be omitted.

The reservation application executed by the terminal device 20 displays the vehicle-sharing reservation screen. The reservation application outputs, to the external server 50, the rental place designated by the user, the riding start time input by the user, and the riding end time input by the user. The external server 50 stores, in the vehicle-sharing database, the rental place, the riding start time, and the riding end time, which are acquired from the reservation application. As described below, the rental place and the riding start time, which are stored in the vehicle-sharing database, are output from the external server 50 to the server 30.

Figure 9:
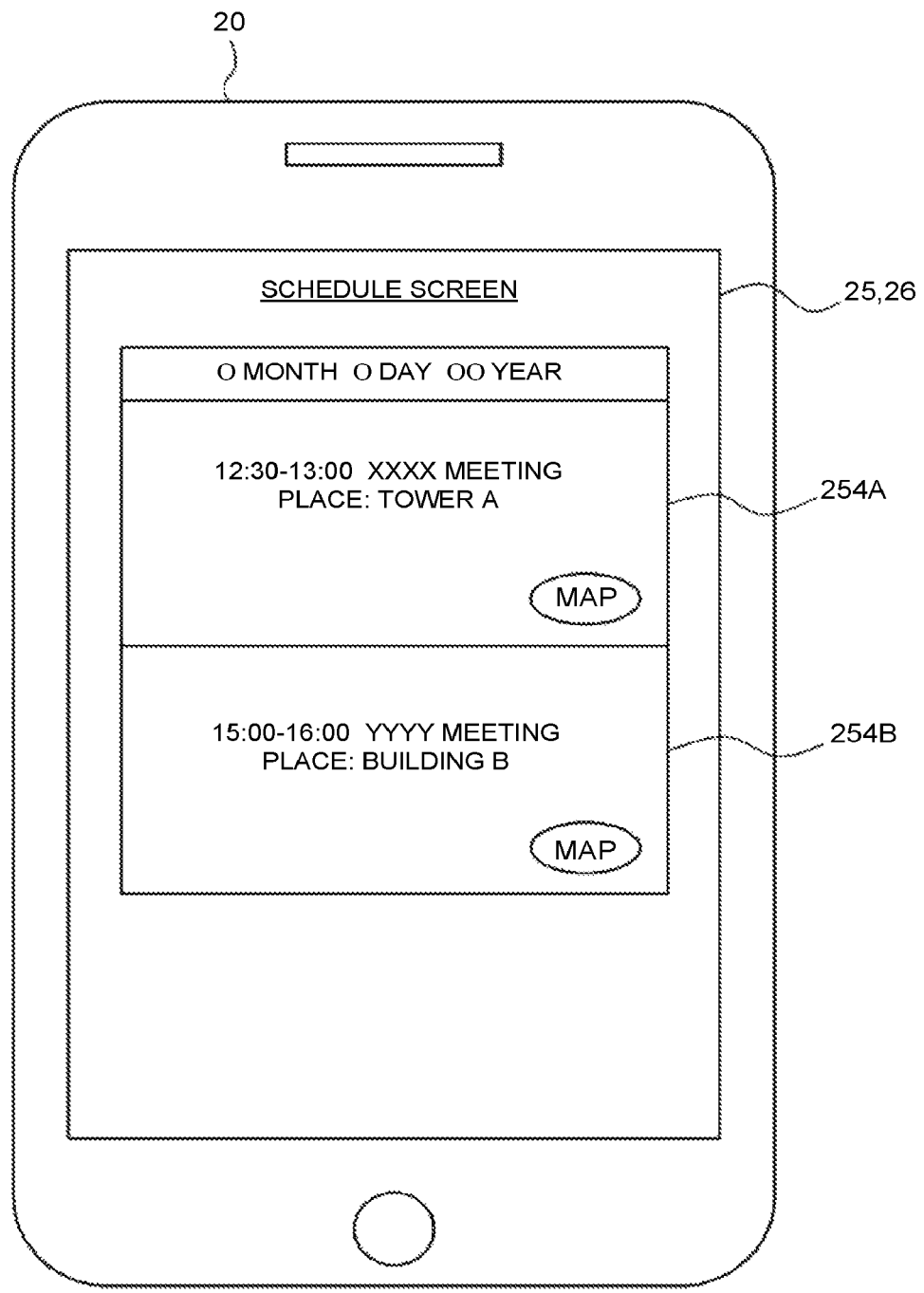
FIG. 9 is a diagram illustrating an example of a schedule screen.

FIG. 9 illustrates an example of a schedule screen of the user displayed on the terminal device 20. The schedule screen is displayed on, for example, the touch panel display in which the output unit 25 and the input unit 26 are integrated. For example, by touching one displayed schedule (for example, XXXX Meeting), the user can cause the reservation application to display an editing screen and edit the content. In addition, for example, by touching a portion of the screen on which the schedule is not displayed (for example, a blank portion in the outer edge of the screen), the user can cause the reservation application to display a new registration screen and input a new schedule. In the example of FIG. 9, the schedule screen displays the user's schedules on O Month, O Day, OO Year in order of start times. Specifically, the schedule screen displays a first activity schedule (XXXX Meeting to be held at Tower A from 12:30 to 13:00) on an area 254A. Moreover, the schedule screen displays a second activity schedule (YYYY Meeting to be held at Building B from 15:00 to 16:00) on an area 254B. Here, the schedule screen includes an image (a MAP button) for displaying a map of a place of each of the first activity schedule and the second activity schedule. In the example of FIG. 9, when the user touches the MAP button included in the area 254B, a place of the second activity schedule is shown on the map.

The scheduler executed by the terminal device 20 displays the schedule screen based on the management database stored by the server 30. The user manages his or her own schedule using the scheduler. For this reason, when a new travel schedule is generated, convenience for the user will be improved if it is automatically reflected in the scheduler.

Figure 10:
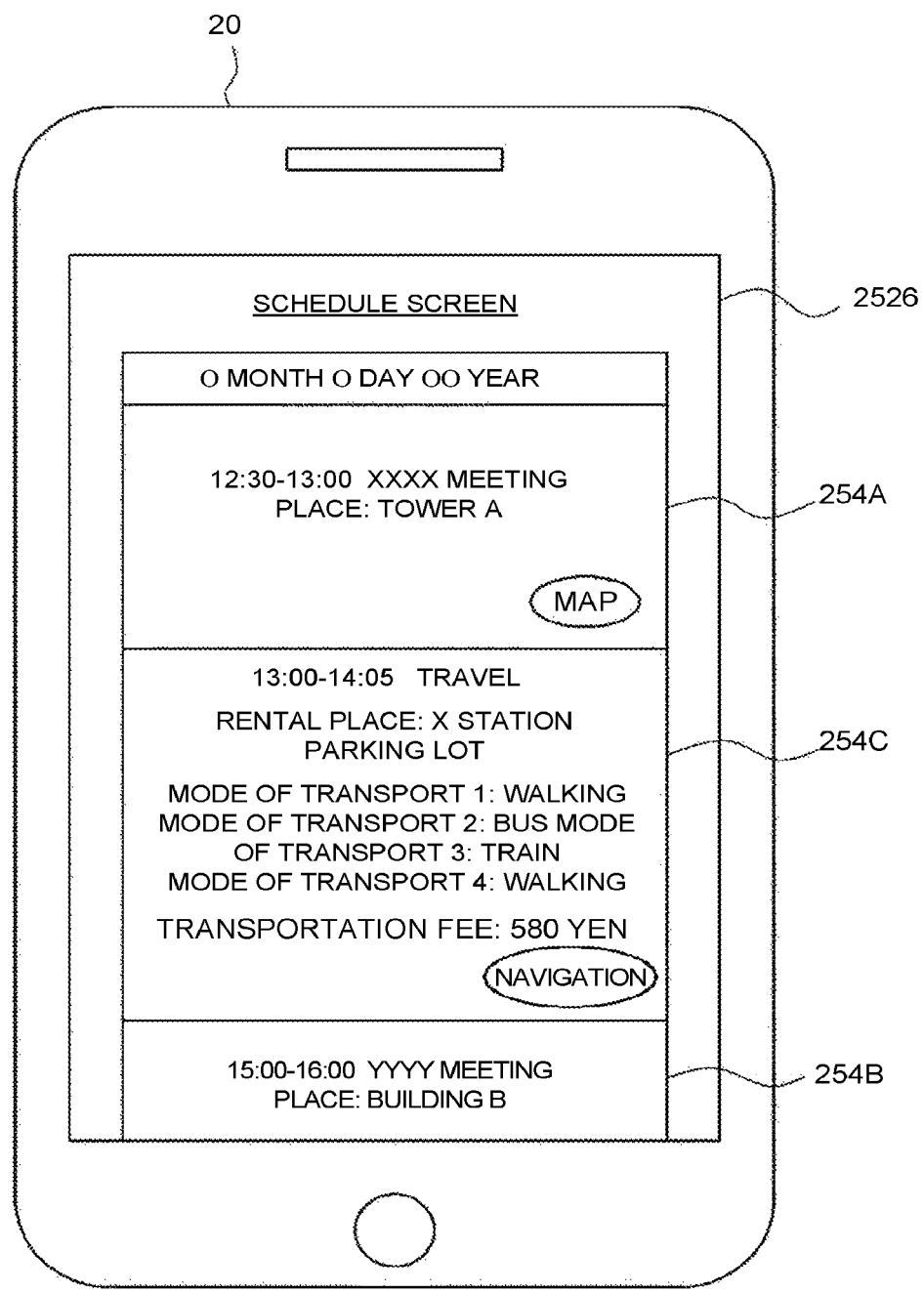
FIG. 10 is a diagram illustrating another example of the schedule screen.

FIG. 10 illustrates another example of the user's schedule screen displayed on the terminal device 20. FIG. 10 illustrates the schedule screen on which a searched route to the rental place of the vehicle 10 reserved by the user, or the like, is reflected after the schedule screen illustrated in FIG. 9 is displayed. As illustrated in FIG. 10, a third activity schedule (travelling to the X station parking lot, which is the rental place, from 13:00 to 14:05) is displayed on an area 254C. On the area 254C, all the modes of transport required for travelling to the rental place are described in order. In addition, on the area 254C, a total of the fees (fares) required for travelling to the rental place is described. Further, the schedule screen displays the user's schedule in order of start times. For this reason, the third activity schedule is displayed between the first activity schedule (XXXX Meeting to be held at Tower A from 12:30 to 13:00) and the second activity schedule (YYYY Meeting to be held at Building B from 15:00 to 16:00). Here, the third activity schedule is automatically added by the server 30. In other words, the third activity schedule is not input by the user.

In addition, the schedule screen may include an image (a navigation button) for guiding a travel route of the third activity schedule. In the example of FIG. 10, when the user touches the navigation button included in the area 254C, the scheduler notifies to the server 30 a fact that the navigation button included in the area 254C is touched. When detecting a predetermined operation of the user on the scheduler, that is, a touch of the user on the navigation button, the server control unit 33 outputs the map information to the terminal device 20 such that the searched route to the rental place is shown on the map of the scheduler.

Figure 11:
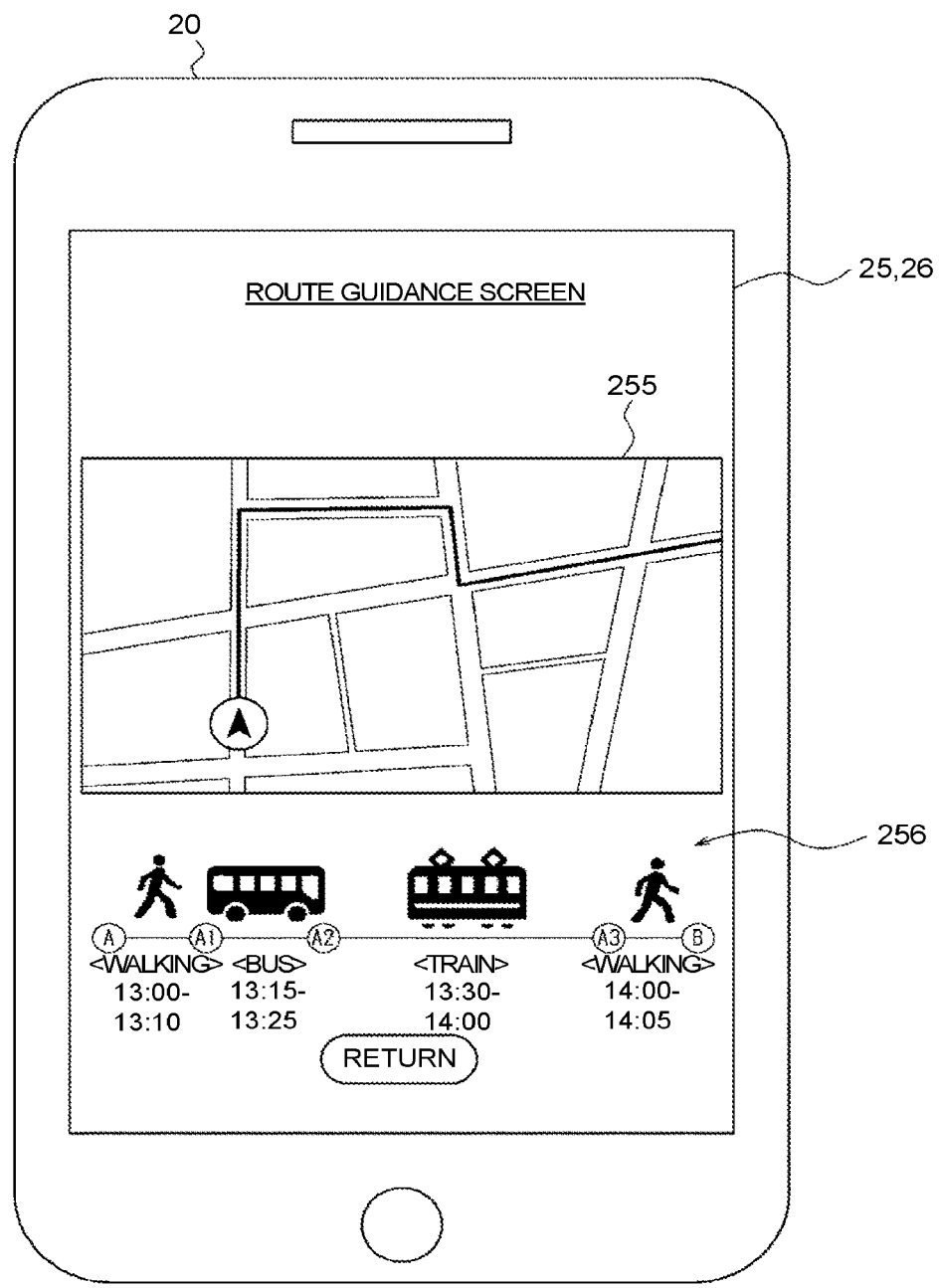
FIG. 11 is a diagram illustrating an example of a route guidance screen.

FIG. 11 illustrates an example of a route guidance screen displayed on the terminal device 20. The route guidance screen shows, on the map, the searched route to the rental place. The route guidance screen illustrated in FIG. 11 is displayed when the user touches the navigation button on the schedule screen in FIG. 10. The route guidance screen includes a map area 255 and a mode of transport display area 256. On the map area 255, the route from the departure place A to the rental place is B is displayed by being superimposed on a road or a train track on the map. On the map area 255, the user's current position may be displayed. On the mode of transport display area 256, the mode of transport to travel to the route is shown along with an estimated travel time. In the example of FIG. 11, a first mode of transport for the route, that is, a mode of transport for a section from the departure place A to a first middle point A1, is "walking". A mode of transport for a section from the first middle point A1 to a second middle point A2 is a "bus". A mode of transport for a section from the second middle point A2 to a third middle point A3 is a "train". A last mode of transport for the route, that is, a mode of transport for a section from the third middle point A3 to the rental place B, is "walking". The user can leave the departure place A at 13:00 and arrive at the rental place B at 14:05. On the mode of transport display area 256, an estimated travel time for each section is shown. For example, in the first section, the user can leave the departure place A at 13:00 and arrive at the first middle point A1 at 13:10. Here, as a mode of transport, public transportation is prioritized. In the present embodiment, the mode of transport includes at least one of walking, a bus, and a train.

Communication Processing

The server 30 executes a communication process (an information processing method) to be described below. In this manner, the server 30 automatically reflects the travel route to the rental place and the like in the scheduler when the user reserves the vehicle 10 using the reservation application.

Figure 12:
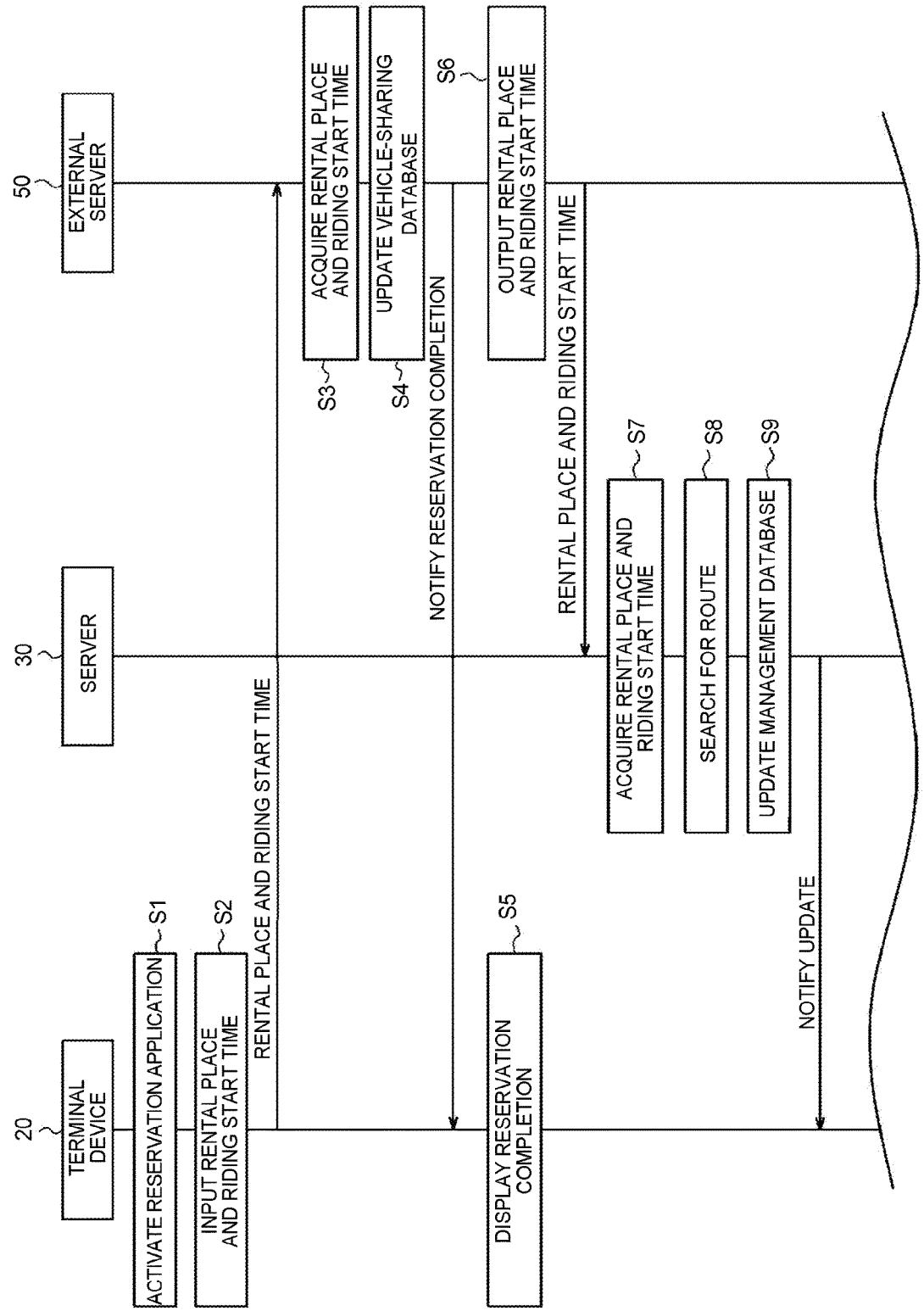
FIG. 12 is an example of a sequence diagram illustrating an information processing method using the server.

FIGS. 12 and 13 illustrate an example of a sequence diagram showing the communication process that the server 30 executes along with the terminal device 20 and the external server 50.

The terminal device 20 activates the reservation application in response to an operation of the user (for example, a user's tap on an icon of the reservation application) (step S1).

The reservation application executed by the terminal device 20 displays the vehicle-sharing reservation screen. The terminal device 20 acquires information input by the user. Here, at least the rental place and the riding start time are input (step S2). The terminal device 20 outputs, to the external server 50, the rental place and the riding start time input by the user.

The external server 50 acquires the rental place and the riding start time from the terminal device 20 (step S3).

The external server 50 stores, in the vehicle-sharing database, the rental place and the riding start time, which are acquired from the terminal device 20. In other words, the external server 50 updates the vehicle-sharing database (step S4). Then, the external server 50 outputs, to the terminal device 20, a reservation completion notification indicating that the reservation of the vehicle 10 is completed.

When the terminal device 20 acquires the reservation completion notification from the external server 50, the terminal device 20 displays reservation completion (step S5). The reservation completion is displayed to inform the user that the reservation of the vehicle 10 is completed.

Further, after the external server 50 updates the vehicle-sharing database, the external server 50 outputs, to the server 30, the rental place and the riding start time, which are acquired from the terminal device 20 (step S6).

The server 30 acquires the rental place and the riding start time from the external server 50 (step S7).

The server 30 executes the route search (step S8). Here, the server 30 sets the rental place acquired from the external server 50 as the destination. Moreover, the server 30 sets the riding start time acquired from the external server 50 as an arrival time. Here, the server 30 may acquire the position information of the terminal device 20 and set the user's current position as the departure place. As another example, the server 30 may extract, from the management database, the user's schedule immediately before the riding start time acquired from the external server 50, and set a place of the user's extracted schedule as the departure place. Further, the server 30 may prioritize public transportation as the mode of transport.

The server 30 updates the management database to reflect, in the management database, the route, the mode of transport, and the estimated travel time, which are acquired from the route search (step S9). Hereinafter, the route, the mode of transport, and the estimated travel time, which are acquired from the route search and reflected in the management database, are referred to as "updated information". Then, the server 30 provides the terminal device 20 with an update notification indicating that the management database has been updated.

When the terminal device 20 acquires the update notification from the server 30, the terminal device 20 may display a pop-up or the like, prompting the user to activate the scheduler. Then, the terminal device 20 activates the scheduler in response to an operation of the user (for example, a user's tap on an icon of the scheduler) (step S10).

The scheduler executed by the terminal device 20 requests the updated information from the server 30. In other words, the scheduler makes an update request to the server 30 (step S11) such that the server 30 outputs the updated information of the management database to the terminal device 20.

When the server 30 receives the update request from the terminal device 20, the server 30 extracts the updated information from the management database (step S12), and outputs the updated information to the terminal device 20.

When the terminal device 20 acquires the updated information from the server 30, the terminal device 20 displays, as a schedule, the route, the mode of transport, and the estimated travel time, which are acquired from the route search (step S13). The updated information is displayed, for example, as the third activity schedule (travelling to the X station parking lot, which is the rental place, from 13:00 to 14:05) in FIG. 10.

When the terminal device 20 detects a predetermined operation of the user (step S14), the terminal device 20 outputs, to the server 30, a detection notification signal indicating that the predetermined operation has been detected. Here, the predetermined operation is, for example, the user's touch on the navigation button, and is detected by the input unit 26 of the terminal device 20.

When the server 30 receives the detection notification signal from the terminal device 20, the server 30 extracts required map information and outputs it to the terminal device 20 (step S15).

The terminal device 20 displays the searched route to the rental place on the map of the route guidance screen (step S16).

As described above, with the above configuration, the server 30 of the information processing system 1 automatically reflects, in the scheduler, a new travel schedule to the rental place when the user reserves the vehicle 10. As such, the server 30 can improve convenience for the user when the user reserves the vehicle 10.

Moreover, according to the above embodiment, the server 30 notifies the terminal device 20 that the management database including the user's schedule has been updated. The server 30 acquires required information from the external server 50 that manages the vehicle 10 to be shared, and automatically sets a new travel schedule to the rental place. As such, the notification from the server 30 to the terminal device 20 enables the user to recognize at an appropriate time that the new travel schedule has been automatically added.

Further, according to the above embodiment, the new travel route to the rental place of the vehicle 10 to be shared may be displayed on the map. As such, the user can easily reach the rental place. Here, since the new travel route is used for the user to travel to the rental place of the vehicle 10 to be shared, the server 30 selects an appropriate public transportation or the like as a mode of transport. For example, the server 30 can select at least one of walking, a bus, and a train as a mode of transport.

The present disclosure was described above with reference to the drawings and the embodiment. However, it is to be noted that a person skilled in the art can easily make variations and modifications thereto, based on the present disclosure. Therefore, it is also to be noted that these variations and modifications fall within the scope of the present disclosure. For example, functions, and the like, included in each element, each step, or the like, can be rearranged so as not to be logically contradictory, and a plurality of elements, steps, or the like, may be combined into one or divided.

For example, the information processing system 1 may be configured to include the external server 50. Moreover, the configurations of the vehicle 10, the terminal device 20, the server 30, and the external server 50 are merely examples. The vehicle 10, the terminal device 20, the server 30, and the external server 50 do not need to include all of the constituent elements illustrated in FIGS. 2, 3, 4, and 6. The vehicle 10, the terminal device 20, the server 30, and the external server 50 may include constituent elements other than those illustrated in FIGS. 2, 3, 4, and 6.

In addition, although the server 30 and the terminal device 20 work in conjunction with each other to execute various processes, the sharing of the processes between the server 30 and the terminal device 20 in the above embodiment is merely illustrative. For example, the terminal device 20 may execute at least some part of the process executed by the server 30 in the above embodiment. Alternatively, for example, the server 30 may execute at least some part of the process executed by the terminal device 20 in the above embodiment.

Further, although the server 30 and the external server 50 work in conjunction with each other to execute various processes, the sharing of the processes between the server 30 and the external server 50 in the above embodiment is merely illustrative. For example, the external server 50 may execute at least some part of the process executed by the server 30 in the above embodiment. Alternatively, for example, the server 30 may execute at least some part of the process executed by the external server 50 in the above embodiment.

Moreover, for example, a processor mounted on general-purpose electronic equipment, such as a mobile information terminal and a server device, (corresponding to the terminal device 20 and the server 30) can function as the control unit 27 and the server control unit 33. Specifically, the embodiments in the present disclosure can be implemented by storing a program that describes processing details for implementing each function of the electronic equipment in a storage unit (a memory) of the electronic equipment, and reading and executing the program via the processor of the electronic equipment.

What is claimed is:

1. A server configured to communicate with a terminal device used by a user, and an external server, wherein the terminal device is configured to execute a reservation application for the user to reserve a rental place and a riding start time of a vehicle while communicating with the external server, and execute a scheduler application that displays a schedule of the user, the server comprising:
   a memory configured to store map information, and timetable information for public transportation;
   a server communication device including circuitry configured to acquire, from the external server, the rental place and the riding start time of the vehicle reserved by the user; and
   a processor configured to set the rental place as a destination and the riding start time as an arrival time based on the map information and the timetable information, and execute a route search,
   wherein the processor is configured to control the server communication device such that the server communication device outputs, to the terminal device, a route, a mode of transport, and an estimated travel time, which are acquired from the route search, and that the scheduler application of the terminal device automatically reflects a new travel schedule to the reserved rental place when the user reserves the vehicle by displaying, as the schedule of the user, the route, the mode of transport, the estimated travel time, and a plurality of scheduled activities that had been scheduled prior to when the user reserved the vehicle,
   the terminal is configured to display a navigation button on the scheduler application for operation by the user and to receive a touch operation of the user on the navigation button,
   the processor is configured to, when detecting the touch operation of the user on the navigation button of the scheduler application, control the server communication device such that the server communication device outputs the map information to the terminal device, and the scheduler application displays a route guidance screen including the searched route on a map area and the mode of transport to travel to the route on a transport display area, and
   the mode of transport includes a train, and the processor is configured to determine that the user is travelling on the train based on position information of the terminal device and detection values of an acceleration sensor and a magnetic sensor of the terminal device.

2. The server according to claim 1, wherein:
   the memory is configured to store a management database that includes the schedule of the user used in the scheduler application;
   the processor is configured to update the management database to reflect, in the management database, the route, the mode of transport, and the estimated travel time, which are acquired from the route search; and
   the processor is configured to control the server communication device such that the sever communication device outputs, to the terminal device, a notification indicating that the management database is updated.

3. An information processing method using a server, wherein the server is configured to communicate with a terminal device used by a user, and an external server, and the terminal device is configured to execute a reservation application for the user to reserve a rental place and a riding start time of a vehicle while communicating with the external server, and execute a scheduler application that displays a schedule of the user, the information processing method comprising:
   storing, in the server, map information and timetable information for public transportation;
   acquiring, by the server, the rental place and the riding start time of the vehicle reserved by the user from the external server;
   setting, by the server, the rental place as a destination and the riding start time as an arrival time based on the map information and the timetable information, and executing, by the server, a route search;
   outputting, by the server, a route, a mode of transport, and an estimated travel time, which are acquired from the route search, to the terminal device, such that the scheduler application of the terminal device automatically reflects a new travel schedule to the reserved rental place when the user reserves the vehicle by displaying, as the schedule of the user, the route, the mode of transport, the estimated travel time, and a plurality of scheduled activities that had been scheduled prior to when the user reserved the vehicle;
   displaying a navigation button on the scheduler application for operation by the user;
   receiving a touch operation of the user on the navigation button; and
   when detecting the touch operation of the user on the navigation button of the scheduler application, outputting the map information to the terminal device, and displaying, via the scheduler application, a route guidance screen including the searched route on a map area and the mode of transport to travel to the route on a transport display area,
   wherein the mode of transport includes a train, and the information processing method further comprises determining that the user is travelling on the train based on position information of the terminal device and detection values of an acceleration sensor and a magnetic sensor of the terminal device.

4. A non-transitory computer-readable storage medium storing a program that causes a server to execute a control process, wherein the server is configured to communicate with a terminal device used by a user, and an external server, and the terminal device is configured to execute a reservation application for the user to reserve a rental place and a riding start time of a vehicle while communicating with the external server, and execute a scheduler application that displays a schedule of the user, the control process comprising:

storing map information and timetable information for public transportation;

acquiring, from the external server, the rental place and the riding start time of the vehicle reserved by the user;

setting the rental place as a destination and the riding start time as an arrival time based on the map information and the timetable information, and executing a route search;

outputting, to the terminal device, a route, a mode of transport, and an estimated travel time, which are acquired from the route search, such that the scheduler application of the terminal device automatically reflects a new travel schedule to the reserved rental place when the user reserves the vehicle by displaying, as the schedule of the user, the route, the mode of transport, the estimated travel time, and a plurality of scheduled activities that had been scheduled prior to when the user reserved the vehicle;

displaying a navigation button on the scheduler application for operation by the user;

receiving a touch operation of the user on the navigation button; and when detecting the touch operation of the user on the navigation button of the scheduler application, outputting the map information to the terminal device, and displaying, via the scheduler application, a route guidance screen including the searched route on a map area and the mode of transport to travel to the route on a transport display area, wherein the mode of transport includes a train, and the control process further comprises determining that the user is travelling on the train based on position information of the terminal device and detection values of an acceleration sensor and a magnetic sensor of the terminal device.

\* \* \* \* \*